United States Patent
Fontaine

(10) Patent No.: US 10,053,586 B2
(45) Date of Patent: Aug. 21, 2018

(54) METHOD OF APPLYING AN ELASTOMERIC COATING COMPOSITION

(71) Applicant: Matthew Fontaine, Fletcher, NC (US)

(72) Inventor: Matthew Fontaine, Fletcher, NC (US)

( * ) Notice: Subject to any disclaimer, the term of this patent is extended or adjusted under 35 U.S.C. 154(b) by 0 days.

(21) Appl. No.: 15/717,198

(22) Filed: Sep. 27, 2017

(65) Prior Publication Data

US 2018/0016448 A1    Jan. 18, 2018

Related U.S. Application Data

(63) Continuation of application No. 15/056,052, filed on Feb. 29, 2016, now abandoned.

(60) Provisional application No. 62/126,587, filed on Feb. 28, 2015.

(51) Int. Cl.
| | | |
|---|---|---|
| *C09D 7/00* | (2018.01) | |
| *C09D 5/20* | (2006.01) | |
| *C09D 153/00* | (2006.01) | |
| *C09D 7/12* | (2006.01) | |
| *C09D 7/65* | (2018.01) | |
| *C09D 7/48* | (2018.01) | |
| *C09D 7/20* | (2018.01) | |
| *C09D 7/61* | (2018.01) | |

(52) U.S. Cl.
CPC ............... *C09D 5/20* (2013.01); *C09D 7/001* (2013.01); *C09D 7/125* (2013.01); *C09D 7/1216* (2013.01); *C09D 7/1241* (2013.01); *C09D 7/20* (2018.01); *C09D 7/48* (2018.01); *C09D 7/61* (2018.01); *C09D 7/65* (2018.01); *C09D 153/00* (2013.01)

(58) Field of Classification Search
CPC ..... C09D 7/001; C09D 7/1216; C09D 7/1241
See application file for complete search history.

(56) References Cited

U.S. PATENT DOCUMENTS

2016/0152871 A1 *   6/2016   Bieber ..................... C09J 11/06
                                                        521/140

* cited by examiner

*Primary Examiner* — Robert Harlan
(74) *Attorney, Agent, or Firm* — GrayRobinson, P.A.

(57) ABSTRACT

A method of applying an elastomeric coating composition to enhance or alter the aesthetic appearance of an automobile. The coating composition can be applied by spraying onto either a vehicle paint job or clear coat and is semi-permanent upon drying. The coating composition can be manually removed from the vehicle by peeling without damaging the underlying paint job or clear coat on the vehicle.

15 Claims, No Drawings

US 10,053,586 B2

METHOD OF APPLYING AN ELASTOMERIC COATING COMPOSITION

CROSS REFERENCE TO RELATED APPLICATIONS

This application is a continuation of application Ser. No. 15/056,052 filed on Feb. 29, 2016 entitled "Elastomeric Coating Composition and Method of Applying Same" which claims priority to Provisional Application No. 62/126,587 filed on Feb. 28, 2015 and entitled "Elastomeric Coating Composition and Method of Applying Same." The content of these applications are fully incorporated herein for all purposes.

BACKGROUND OF THE INVENTION

This invention relates to an elastomeric coating specifically engineered to enhance or alter the aesthetic appearance of an automobile and its application. In traditional settings, automobile paint shops change the color and finish of trucks, cars, and other vehicles by applying permanent paint to the exterior of the vehicle. This process is extremely time consuming, expensive, and irreversible unless the owner starts over and re-paints the vehicle again.

Other aesthetic enhancements to vehicles include pin stripe appliques or the like. These kinds of embellishments are often glued to the surface of the vehicle to provide a unique look to the exterior finish and are intended to be permanent.

The main kinds of temporary exterior enhancements to a vehicle finish are often magnetized or attached with a removable glue, neither of which is durable.

A need exists in the art of automobile finishing for a solution to the problem that individuals and businesses prefer to decorate their vehicles with finishes that are changeable without having to re-paint or re-apply a permanent finish again and again.

BRIEF SUMMARY OF THE INVENTION

A coating composition for vehicles, comprises a polymer, a tackifier, a hydrocarbon resin; and a solvent.

In another embodiment, the coating composition includes a styrene/ethylene/butylene/styrene liner triblock copolymer in an amount by weight of 6.51 percent; a hydrocarbon resin in an amount by weight of 5.70 percent; a tackifier in an amount by weight of 1.14 percent; silicon dioxide thixotrope in an amount by weight of 0.57 percent; a hindered amine light stabilizer (HALS) in an amount by weight of 0.20 percent; a UV stabilizer in an amount by weight of 0.20 percent; an antioxidant in an amount by weight of 0.20 percent; a solvent blend including a mixture of 22/11/9 of Xylene, Toluene, and VM&P Naphtha in an amount by weight of 85.47 percent.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

DETAILED DESCRIPTION OF THE PREFERRED EMBODIMENT

In one embodiment, the coating of this disclosure is an elastomeric coating composition that is useful in part to cover the exterior finish of a vehicle in a semi-permanent manner. As used herein, the term "vehicle" encompasses all of the usual embodiments of a device used for travel, including but not limited to, automobiles and trucks. Other kinds of vehicles may also fall within the scope of this invention, such as more specialized uses like race cars, motorcycles, golf carts, or even boats. None of these examples limits the kinds of "vehicles" for which the coating described herein may be used.

The coating described in this disclosure is considered semi-permanent in that the coating, applied properly, does not wash off or fall off the vehicle after application, but stays in place on the vehicle until the user chooses to remove it. When the user or owner of a vehicle decides to remove the coating, the coating is amenable to being peeled off without harming the underlying original finish of the vehicle. The coating, however, does not detach from the original finish of the vehicle unless and until the user makes a concerted effort to peel the coating off of the vehicle.

When the coating is removed, the coating does not damage the underlying finish to which it has been applied. In one embodiment, the coating is an adherent film, configured for spraying onto a vehicle and having a formulation including, at least in part:

1) Thermoplastic rubber
2) Hydrocarbon resin
3) Tackifier
4) Solvent system using Varnish Makers & Painters (VM&P) Naphtha, Xylene, and Toluene
5) Thixotropic Silica
6) Anti-oxidant/UV stabilizers. In one embodiment, the anti-oxidants and UV stabilizers are applied as a solution to the coating and allowed to air dry thereon.

Subsequent layers provide for full coverage, where desired results can be achieved.

The coating described herein, therefore, relates to an improved elastomeric coating composition used to alter the original appearance of a vehicle and a number of its exterior components, including but not limited to painted or clear coat surfaces, trim, wheels, rims, and badges, whereby future removal is allowed, returning the vehicle back to its originally equipped and manufactured state.

One method of the present invention includes the utilization of the coating solution to coat the vehicle in stages, where the initial coat and each subsequent layer is allow to air dry thereby providing for a desired change or changes in appearance. The film is both adherent and of uniform composition, and forms a rugged composite shell which retains its elastomeric properties under prolonged UV exposure and other naturally occurring environmental elements. The composite film was engineered with an application-specific bond strength to achieve both adequate adhesion balanced with good removability characteristics, as well as superior tensile and peel strength properties. The quantity of tackifier used in the formulation is within a range and concentration so that the film is stable upon vehicle application and will stay on the outer surface of the vehicle so long as the owner desires, but with the tackifier used in proper quantities, the film peels off the surface of the vehicle without damaging the underlying original paint job or clear coat. In this way, the tackifier is used in the appropriate quantity and the film solution has a tackifier therein in a range of composition or concentration to ensure that the film is peel-able upon drying. The peeling force needed to remove the film after drying is within a range allowing for peeling by hand without damaging the original paint job and clear coat on the vehicle.

Generally, the present invention is an adherent-coherent coating system where a base or primer coat is not required. The coating is sprayed directly onto an original equipment manufacturer vehicle finish. The coating described herein has made significant contributions to the development of a pigment carrier system and loading concentrations of the same in order to achieve the desired appearance after a specified number of coats. The application technique for the coating is by pressurized spraying via HVLP (high volume low pressure) spraying equipment.

The pigment carrier system used with the film described herein is important, as the color of the film can be very important for marketing and commercial applications. The pigments used to color the film may be proprietary to the owner of the technology disclosed herein, such that pigments that are wetted into solution yield vibrant, deeper, or generally more aesthetically pleasing colors. The carriers used for the pigments may be based in polyol compounds or mineral oil mixtures.

Typically composite coatings are measured by a number of desirable physical and chemical properties such as durability, adhesion, cohesion, and bond and peel strengths. As a rule, the inventor maximized each of these properties whenever possible; however, as often was the case a tradeoff occurred, where the increase of one component led to an adverse reaction in the overall composite system; therefore, the inventor employed a measured compromise approach with respect to the conflicting properties in order to achieve a collection of desired use characteristics.

Research and trials of at least 100 attempts were employed using various types and ratios of styrene/ethylene/butylene elastomers, hydrocarbon resins, thixotropic silicas and solvents and respective ratios that best provided for adequate spray and finishing characteristics, strength and durability properties, coupled with desired bond and peel behaviors.

A number of various hydrocarbon resins were incorporated to help enhance the overall durability and scratch resistance not yet achieved by earlier formulations. After rigorous research and development, certain hydrocarbon resins, for example but not limited to Eastman's Plastolyn™ 290, have been identified as being one useful ingredient to aid the enhancement of the coatings overall look, feel, finish texture and enhanced mar resistance, again not seen by earlier formulations. Other purified aromatic monomers having similarly high softening points are also options for this line of coatings. In one embodiment, other aromatic hydrocarbon resins having a softening point of at least 140 degrees Celsius (according to ASTM D6493-11(2015), Standard Test Methods for Softening Point of Hydrocarbon Resins and Rosin Based Resins) and a melt viscosity of about 1000 poise at 165 degrees Celsius could provide similar results. In another embodiment, the hydrocarbon resin exhibits a melt viscosity of 1,100 mPa·s (200° C.).

The same is true with the solvent ratios. Each solvent tested had specific properties that among other reactions, i.e. chemical—solubility parameters, Kb values, and polar and/or non-polar reactions, must be incorporated into the composite system in specific orders and quantities to aid in the proper homogeneous solution and subsequent end use via the high volume low pressure spraying equipment. More rigorous testing identified both the candidates and ratios thereof for use in the end composite solution.

As with all elastomeric films built to an adequate thickness, the subject coating shares similar properties in its imperviousness to acids, alkalis, salts, moisture, and capability of withstanding prolonged UV exposure while remaining flexible over a wide range of temperatures.

Therefore, it is a primary objective of the subject invention to provide an improved coating used in aid of altering or enhancing the appearance of the exterior of automobiles and method of doing the same. The dried composite film possesses superior texture such that a satin or vinyl look is achieved and bond, peel and tensile strength characteristics are optimized for end user ease of use.

Furthermore, the subject invention is to provide an improved technique for coating the exterior of automobiles such that a smooth vinyl and/or satin like appearance can be achieved not seen in earlier formulations.

Furthermore, augmenting the subject invention using colorants, namely of organic and inorganic variety, but not limited to the use of automotive powders, flakes and pearls.

Other and further objects of the present invention will become apparent to those skilled in the art upon a study of the following specification and appended claims.

The thermoplastic rubber component consists of a styrene/ethylene/butylene/styrene linear triblock copolymer. The undusted hydrogenated version of these triblock copolymers is utilized.

This material is sprayed on the substrate, i.e. clear-coat to be coated in multiple coats to ensure adequate coverage and uniform texture across the entire surface sprayed. After application, the film is allowed to dry, with the solvent becoming fugitive to the system; but in a specific order where the tail solvent, in this case xylene, provides for adequate leveling. The following paragraphs list examples of formulations used to form the film disclosed herein:

EXAMPLE 1

Subject Coating/Film Formulation

| Ingredient | Percent by Weight |
| --- | --- |
| Styrene/ethylene/butylene/styrene liner triblock copolymer, e.g., sold by Kraton Performance Polymers, Inc. under the designation "Kraton G-1652" | 6.51 |
| Hydrocarbon resin-e.g., Plastolyn 290 sold by Eastman Chemical Company | 5.7 |
| Tackifier e.g., Eastotac H100 W sold by Eastman Chemical Company | 1.14 |
| Silicon dioxide Thixotrope sold by Cabot Corp. e.g., Cabosil M-5 | 0.57 |
| Hindered amine light stabilizer (HALS) Chemstab LS-292 e.g., distributed by TMC Materials, Inc. | 0.20 |
| UV stabilizer Chemsorb LS-328 e.g., distributed by TMC Materials, Inc. | 0.20 |
| Antioxidant Chemnox AN-1010 e.g., distributed by TMC Materials, Inc. | 0.20 |
| A solvent blend including a mixture of 22 I 11 I 9 of Xylene, Toluene, and VM&P Naphtha. | 85.47 |

EXAMPLE 2

Subject Coating/Film Formulation

| Ingredient | Grams | Percent by Weight |
| --- | --- | --- |
| Kraton 1652 | 32 | 6.50% |
| Plastolyn 290 | 28 | 5.69% |
| Eastotac H100 | 4.5 | 0.91% |
| Cab-o Sil M5 | 3.7 | 0.75% |
| Chemstab | 1.8 | 0.37% |
| Chemsorb | 1.3 | 0.26% |
| Chemnox | 1 | 0.20% |
| Xylene | 220 | 44.69% |
| Toluene | 120 | 24.38% |
| Naphtha | 80 | 16.25% |
| TOTAL | 492.3 | 100.00% |

EXAMPLE 3

Pigmentation

| Pigment | Ounces/gallon by weight in Ounces |
| --- | --- |
| Covert Black 12808-A | 3 |
| Killa Red R-8174 | 3 |
| Bright White W-4514-B | 5.7 |
| Primer Gray 12823 | 5.7 |
| Glacier Blue B-7934 | 4.7 |
| Lethal Blue B-6591-A | 4.2 |
| Venom Green G-7380-A | 4.2 |
| Incendiary Yellow Y-3922-A | 5.7 |
| Agent Orange O-1981-B | 5.7 |
| Purple P-1468-A | 5.8 |
| Pink R-8187-A | 5.2 |
| Mil Spec Tan T-6276 | 4.2 |
| Mil Spec Green G-7384 | 3.2 |
| Gangsta Black KSEB-2022 | 3 |

Another layer of gloss coating is also an option for the coating described herein. One example is a spray-able gloss coating having a slow activator, such as but not limited to, SEM 50501 EZ Clear Coat. Applying this kind of gloss coat to the peel-able coating formulation described above gives the shiny finish that users desire and still allows the resulting finish to be peeled off without damaging the paint and clear coat below.

These and other aspects of the film composition and method of making the same are set forth in the claims below.

What is claimed is:

1. A method of applying a removable and semi-permanent coating onto a vehicle comprising:
   forming a composition of:
   a styrene/ethylene/butylene/styrene liner triblock copolymer;
   a hydrocarbon resin;
   a tackifier;
   a silicon dioxide thixotrope;
   a hindered amine light stabilizer;
   a UV stabilizer;
   an antioxidant;
   a solvent blend; and
   applying the composition to a vehicle surface and forming an outer layer of the composition on the vehicle.

2. The method according to claim 1 further comprising applying a gloss layer onto the layer of the composition.

3. The method according to claim 1 further comprising applying a gloss layer onto the outer layer of the composition.

4. The method according to claim 1 further comprising applying a gloss layer onto the outer layer of the composition.

5. The method according to claim 1 wherein the tackifier is present in an amount greater than 1 percent.

6. The method according to claim 1 wherein the silicon dioxide thixotrope is present in an amount greater than 0.5 weight percent.

7. The method according to claim 1 wherein the hindered amine light stabilizer is present in an amount greater than or equal to 0.20 weight percent.

8. The method according to claim 1 wherein the UV stabilizer is present in an amount greater than or equal to 0.20 weight percent.

9. The method according to claim 1 wherein the antioxidant is present in an amount greater than or equal to 0.20 weight percent.

10. The method according to claim 1 wherein the solvent blend comprises a mixture of 2/11/9 of Xylene, Toluene, and VM&P Naphtha in an amount greater than 80 weight percent.

11. The method according to claim 1 wherein the composition is manually peel-able when dried onto a surface.

12. The method according to claim 1 wherein the hydrocarbon resin has a melting point of at least 140 degrees Celsius.

13. The method according to claim 1 wherein the composition is manually peel-able when dried onto a surface.

14. The method according to claim 1 wherein the composition has a viscosity configured for use in a high volume low pressure sprayer application.

15. A method of applying a removable and semi-permanent coating onto a vehicle comprising:
    forming a composition of:
    a styrene/ethylene/butylene/styrene liner triblock copolymer;
    a hydrocarbon resin;
    a tackifier;
    a silicon dioxide thixotrope;
    a hindered amine light stabilizer;
    a UV stabilizer;
    an antioxidant; and
    a solvent blend;
    applying the composition to a vehicle surface and forming an outer layer of the composition on the vehicle; and
    applying a gloss layer onto the outer layer of the composition.

* * * * *

UNITED STATES PATENT AND TRADEMARK OFFICE
CERTIFICATE OF CORRECTION

PATENT NO. : 10,053,586 B2
APPLICATION NO. : 15/717198
DATED : August 21, 2018
INVENTOR(S) : Matthew Fontaine It is certified that error appears in the above-identified patent and that said Letters Patent is hereby corrected as shown below:

In the Claims

Column 6, Lines 9-11, cancel the text beginning with "3. The method according to claim 1, further comprising applying a gloss layer onto the outer layer of the composition" and insert the following claim:
--3. The method according to Claim 1 wherein the styrene/ethylene/butylene/styrene liner triblock copolymer is present in an amount greater than 6 weight percent.--

Column 6, Lines 12-14, cancel the text beginning with "4. The method according to claim 1, further comprising applying a gloss layer onto the outer layer of the composition" and insert the following claim:
--4. The method according to Claim 1 wherein the hydrocarbon resin is present in an amount between 5 and 7 percent by weight.--

Signed and Sealed this
Thirtieth Day of October, 2018

Andrei Iancu
*Director of the United States Patent and Trademark Office*